June 26, 1923.

F. B. MERRITT

FOLDING STEERING WHEEL

Filed Jan. 10, 1922

1,459,957

INVENTOR
F.B.Merritt
BY
ATTORNEY

Patented June 26, 1923.

1,459,957

UNITED STATES PATENT OFFICE.

FREDRICK B. MERRITT, OF SACRAMENTO, CALIFORNIA.

FOLDING STEERING WHEEL.

Application filed January 10, 1922. Serial No. 528,350.

*To all whom it may concern:*

Be it known that I, FREDRICK B. MERRITT, a citizen of the United States, and a resident of the city of Sacramento, county of Sacramento, and State of California, have invented a new and useful Folding Steering Wheel, of which the following is a specification.

My invention relates to steering wheels.

The main object of said invention is to provide improved means for allowing that portion of the steering wheel, generally located over the knees, to be folded up and out of the way when getting in and out of a vehicle.

Figure 1:
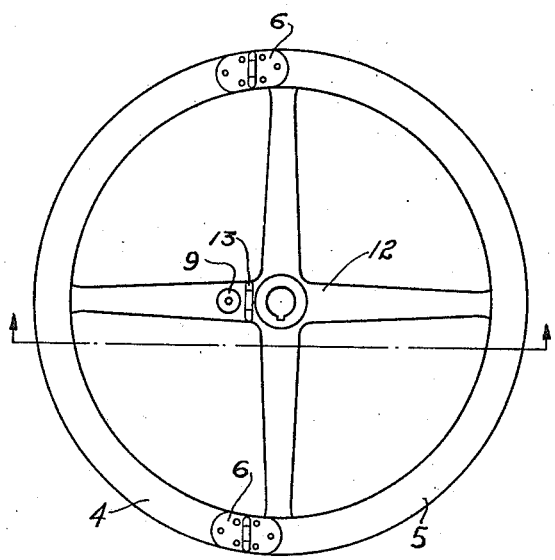
Figure 2:
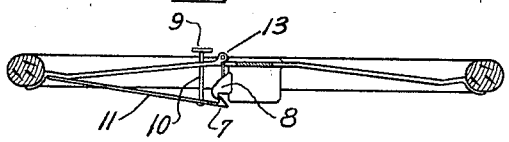
Figure 3:
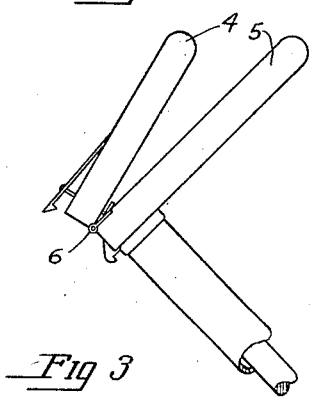

In the drawings Fig. 1 is a plan view of the wheel; Fig. 2 is a cross section of the wheel; Fig. 3 is a side assemble view of the wheel when folded.

My wheel consists of the movable part of the rim (4) secured to the solid part of the rim (5) by means of hinges (6) and locked by means of the catch (7) engaged by lug (8). When desired to raise or fold the wheel, press on the bottom (9) which is secured to rod (10) which in turn presses down on spring (11) and disengages catch (7) from lug (8).

The spokes (12) are made as in any steering wheel, with the exception that one of the spokes is made with a hinge (13) adjacent the hub to allow the wheel to break.

To close the wheel pull back and down on the movable portion of the wheel (4) with a sharp snap and catch (7) automatically engages lug (8).

Having thus described my invention, what I claim as new and useful is:

A steering wheel comprising fixed and movable rim segments, a hub provided with the former, the segments being split on a line to one side of the hub, a spoke on the movable segment at right angles to the split line and extending to the hub, and hinges between said rim segments and between the said spoke and hub arranged to enable the movable segment being folded up onto the fixed segment.

FREDRICK B. MERRITT.